US 8,162,261 B2

(12) United States Patent
Stecko et al.

(10) Patent No.: US 8,162,261 B2
(45) Date of Patent: Apr. 24, 2012

(54) SELF CONTAINED POWER SYSTEM FOR CONTROLLABLE REFUELING DROGUES

(75) Inventors: Stephen M. Stecko, Fullerton, CA (US); Harry W. Slusher, Fountain Valley, CA (US); John F. Takacs, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 527 days.

(21) Appl. No.: 12/265,449

(22) Filed: Nov. 5, 2008

(65) Prior Publication Data

US 2010/0108815 A1    May 6, 2010

(51) Int. Cl.
*B64D 39/00*    (2006.01)

(52) U.S. Cl. .................................................. 244/135 A

(58) Field of Classification Search ............... 244/135 A
See application file for complete search history.

(56) References Cited

U.S. PATENT DOCUMENTS

| | | | |
|---|---|---|---|
| 6,604,711 B1 * | 8/2003 | Stevens et al. | 244/135 A |
| 7,219,857 B2 | 5/2007 | Takacs et al. | |
| 2006/0284019 A1 * | 12/2006 | Takacs et al. | 244/135 A |
| 2008/0027593 A1 * | 1/2008 | Saggio et al. | 701/3 |
| 2008/0054124 A1 * | 3/2008 | Takacs et al. | 244/135 A |
| 2008/0284174 A1 * | 11/2008 | Nagler | 290/54 |
| 2010/0001124 A1 * | 1/2010 | Feldmann | 244/58 |

* cited by examiner

*Primary Examiner* — Tien Dinh
*Assistant Examiner* — Keith L Dixon
(74) *Attorney, Agent, or Firm* — Weiss & Moy, P.C.

(57) ABSTRACT

According to an embodiment, an aerial refueling drogue has a coupling having a channel formed there through. One end of the coupling is attached to a hose. A power generator unit is positioned in the channel of the coupling.

15 Claims, 3 Drawing Sheets

SELF CONTAINED POWER SYSTEM FOR CONTROLLABLE REFUELING DROGUES

BACKGROUND

Embodiments of this disclosure relate generally to refueling drogues, and more particularly, to an onboard self contained fuel flow electrical generator for controllable aerial refueling drogues.

In order to extend the flight range of certain aircraft, some aircraft have been designed with in-flight refueling or air-to-air refueling capabilities. One type of refueling system is a hose and drogue system. The hose and drogue system includes a refueling hose having a drogue disposed at one end. A drogue is a funnel shaped device attached to the end of a refueling hose for connecting with the probe of another aircraft to be refueled in flight. The refueling hose connects to a Hose Drum Unit (HDU). When not in use, the refueling hose and drogue is reeled completely into the HDU. During operation, the refueling tanker flies straight and level and extends the refueling hose and drogue which trails behind and below the refueling tanker under normal aerodynamic forces. Tension on the refueling hose is aerodynamically balanced by a motor in the HDU so that as the receiver aircraft moves, the refueling hose retracts and extends in order to prevent bends in the refueling hose that may cause undue side loads on the refueling probe.

The second type of refueling system is a boom refueling system. The boom refueling system typically includes a rigid boom extending from the refueling tanker, with a probe and nozzle at its distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

Although in-flight refueling is a relatively common operation, the aircraft to be refueled must be precisely positioned relative to the refueling tanker in order to provide safe engagement while the fuel is dispensed to the receiver aircraft. Different systems have been designed to automate the positioning process. For example, some boom refueling systems use cameras housed in the tanker aircraft to determine the distance between the receiver aircraft and the tip of a refueling boom carried by the tanker aircraft. The camera system can then be used to automatically control the position of the boom to mate with a corresponding refueling receptacle of the receiver aircraft.

In another system, a drogue can include movable, overlapping vanes and a canopy. The vanes may be moved to increase or decrease the size of the diameter of the drogue for high speed flight or for lower flight speeds. The drogue may include actuators to control the motion of the vanes and or the canopy. The motion of the actuators may be controlled by a guidance and control system. The guidance system can receive information corresponding to the current state of the drogue and a target state of the drogue. The guidance system can provide instructions to the control system that in turn directs the actuators to drive the configuration of the drogue from the current state to the target state.

The use of aerial refueling systems may be expanded if the refueling drogue had the ability to generate and store electrical power that could be used to run guidance and control systems of the refueling system. This would allow aerial refueling drogues to be retrofitable by bolting on to the end of the refueling hose of existing aerial refueling systems such as Wing Aerial Refueling Pods (WARPs) or Fuselage Hose Drum Units (HDUs). However, present refueling drogues do not have the ability to generate and store its own electrical power which to run the guidance and control systems.

In the past, drogue manufacturers have used onboard wind mill generators located on the external surface of the drogue to generate a small amount of power to help illuminate the drogue so the receiver aircraft pilot can see it during night refueling. However, the wind mill generators are inefficient and were not able to generate sufficient amounts of power to run guidance and control systems of the refueling system. These types of generators also take up valuable space under the drogue cowling, space that is needed for the guidance and control system.

Onboard battery packs have also been used to provide for a controllable drogue power system. However, battery packs only have a limited supply of power before needing to be recharged. In these systems, when the battery packs needed to be recharged, the drogue would have to be retracted back into the aerial refueling pods or HDU of the host aircraft. Once the batteries were recharged, the drogue could be re-extended to refuel again. This is a time consuming process. Furthermore, if the battery packs were to be depleted of power sometime during the refueling process, this could be problematic for the refueling tanker and the aircraft to be refueled.

Therefore, it would be desirable to provide a system and method that overcomes the above problems. The system and method would provide an onboard self-contained electrical generator for controllable aerial refueling drogues.

SUMMARY

An aerial refueling drogue has a coupling having a channel formed there through. One end of the coupling is attached to a hose. A power generator unit is positioned in the channel of the coupling.

An aerial refueling drogue has a coupling having a channel formed there through. One end of the coupling is attached to a hose. A power generator is positioned in the channel. At least one strut is attached to the power generator and an interior of the channel for securing the power generator in the channel. An energy storage device is coupled to the power generator and positioned in a housing of the drogue. A regulator is attached to the power generator and the energy storage device.

A method of generating electrical energy during refueling comprising: attaching a power generator in a channel of a coupling of a drogue, wherein one end of the coupling is attached to a hose; attaching the drogue with a receiver aircraft; and passing fuel through the drogue, the fuel rotating an impeller of the power generator.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
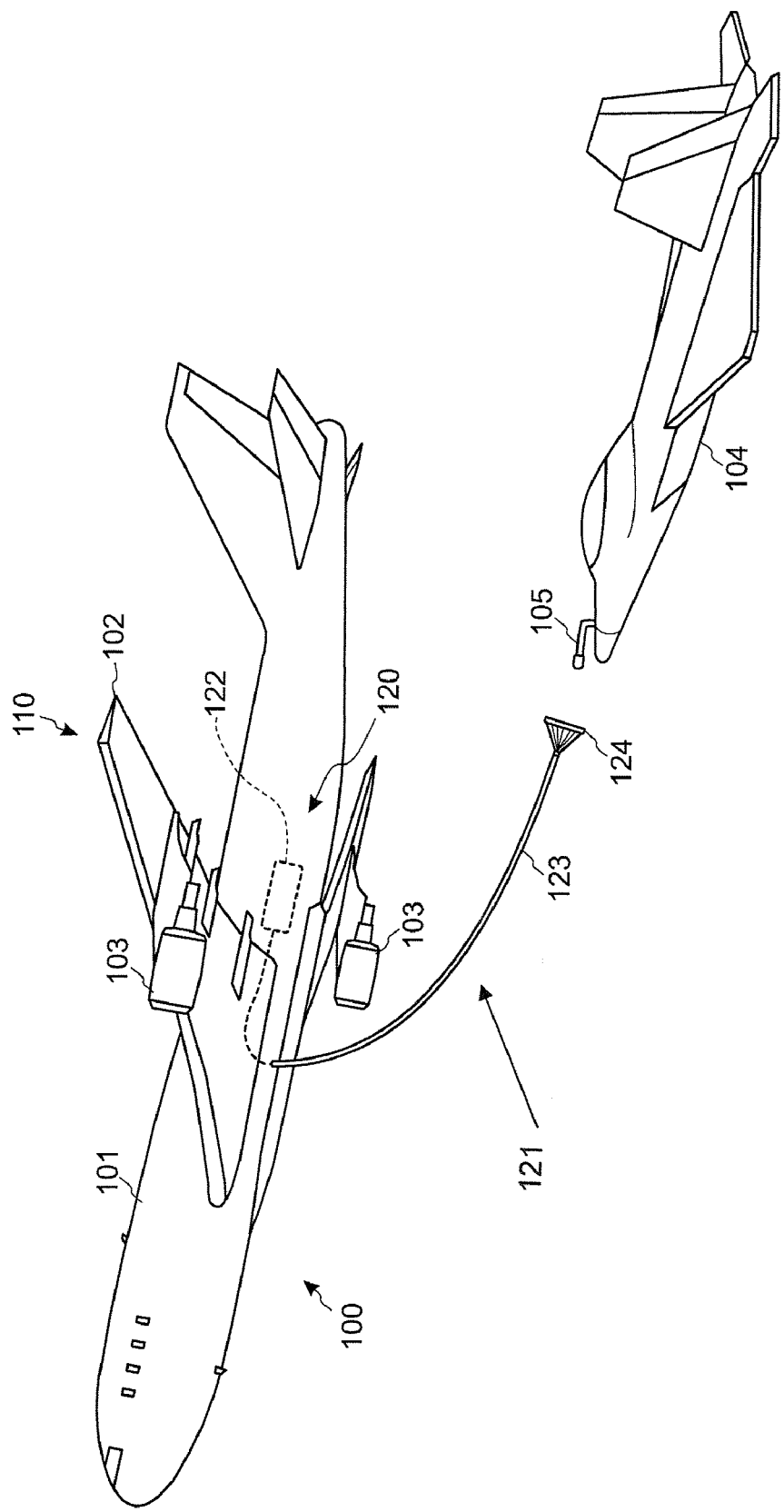
FIG. 1 is a perspective view of a tanker aircraft using a controllable aerial refueling drogue having a self-contained electrical generator for refueling a receiver aircraft.

Referring to FIG. 1, a refueling system 110 is shown. The refueling system 110 may include a tanker aircraft 100 which is positioned to be coupled to a receiver aircraft 104 which needs to be refueled using an aerial refueling device 120.

In the embodiment shown in FIG. 1, the tanker aircraft 100 may have a fuselage 101, wings 102, and one or more engines 103. The tanker aircraft 100 shown in FIG. 1 is shown as an example and the tanker aircraft 100 may take on other forms. The tanker aircraft 100 may have an aerial refueling device 120 attached thereto. The aerial refueling device 120 may include an on-board portion 122 and a deployable portion 121. In accordance with one embodiment, the on-board portion may have a hose reel actuator and associated valving. The deployable portion 121 may include a hose 123 and a drogue 124.

The position of the drogue 124 may be controlled in an automatic fashion to align and couple with a probe 105 of a receiver aircraft 104. In at least some embodiments, the guidance and control system for effectuating the alignment and control may be carried entirely by the deployable portion 121 of the refueling device 120. Accordingly, not only can the process for coupling the drogue 124 to the receiver aircraft 104 be automated or at least partially automated, but the components that execute the automated process need not be carried on-board the tanker aircraft 100. This arrangement can simplify the tanker aircraft 100 and can significantly reduce the effort and expense required to retrofit the guidance system on an existing drogue-carrying tanker aircraft 100.

As stated above, the use of refueling systems 110 may be expanded if the drogue 124 had the ability to generate and store electrical power that could be used to run the guidance and control systems. This would allow aerial refueling drogues to be retrofitable by bolting on to the end of the refueling hose of existing aerial refueling systems.

Figure 2:
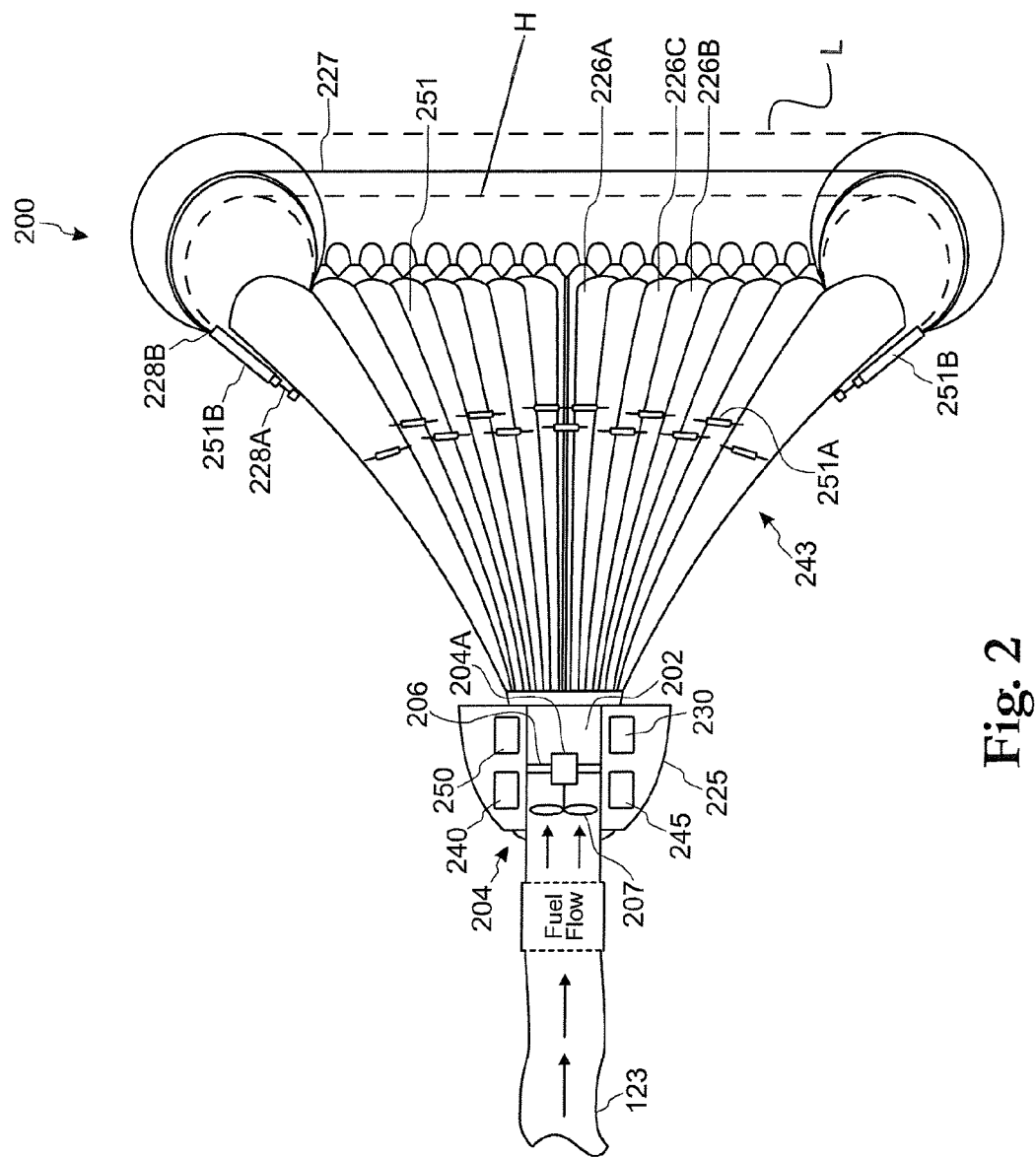
FIG. 2 is a partial schematic illustration of a drogue that includes a self-contained electrical generator to power a control and guidance system of the drogue.

Referring now to FIG. 2, an enlarged, side isometric illustration of an embodiment of a drogue 200 that has the ability to generate and store electrical power that could be used to run guidance and control systems located in the drogue 200 is shown. The drogue 200 may include a coupling 225. The coupling 225 may be used to attach the drogue 200 to a hose 123 such as a fuel hose of a refueling system or the like. The coupling 225 may have a channel 202 formed there through. The channel 202 allows substances from the hose 123 to flow through the drogue 200. In accordance with one embodiment, the channel 202 allows fuel from a fuel hose to flow through the drogue 200.

Located in the channel 202 is a generator unit 204. The generator unit 204 may be a sealed self contained unit housed within the channel 202. The generator unit 204 is generally of a size to allow substances from the hose 123 to flow through channel 202 and out of the drogue 200. Thus, the generator 204 should not substantially impede the flow of a substance through the drogue 200.

A plurality of struts 206 may be used to position and secure the generator 204 within the channel 202. One end of each strut 206 may be attached to the generator unit 204. Another end of each strut 206 may be secured to the interior of the channel 202. In accordance with one embodiment, the struts 206 are hollow. This will allow wiring from the generator unit 204 to be run to a power and control system which is housed in the cowling of the drogue 200.

The generator unit 204 has a rotation device 207 that may be attached to a generator 204A. The rotation device 207 may be a blade turbine or the like. The listing of the above is given as an example and should not be seen in a limiting manner. The generator 204A will convert the movement of the rotation device 207 to electrical energy. Thus when a substance flows through the hose 123 to the drogue 200, the substance will cause the rotation device 207 to turn. The generator 204A will then convert the rotational movement of the rotation device 207 to electrical energy.

The drogue 200 may include a movable section 223. The movable section 223 may allow the drogue 200 to change configuration in order to help position the drogue 200 relative to the receiver aircraft 104. In accordance with one embodiment, the movable section 223 may have a plurality of vanes 226 and a canopy 227. The vanes 226 may be movable, overlapping vanes. When the vanes 226 are spread out from each other, the maximum diameter of the drogue 200 increases, and when the vanes 226 are drawn together, the maximum diameter of the drogue 200 decreases. The canopy 227 can operate like a donut-shaped parachute and can be filled by incoming air. If the canopy 227 is drawn tightly down over the vanes 226, the drogue 200 can have a generally streamlined shape suitable for high speed flight. If the canopy 227 is allowed to more fully inflate, the drogue 200 can be operated at lower flight speeds.

The drogue 200 may include actuators 251 to control the motion of the vanes 226 and/or the canopy 227. In accordance with one embodiment, the actuators 251 may include vane actuators 251A and or canopy actuators 251B. The vane actuators 251A may be attached between alternate vanes 226, and may be configured to extend or retract. Accordingly, when a particular vane actuator 251A retracts, it may pull two vanes 226A, 226B together relative to an intermediate vane 226C. When the vane actuators 251A are extended, they may move the same two vanes 226A, 226B apart relative to the intermediate vane 226C.

The canopy actuators 251B may be attached to an inner and or outer line of the canopy 227. In accordance with one embodiment as shown in FIG. 2, the canopy 227 can be attached with a fixed line 228A to the outwardly facing surfaces of the vanes 226, and can be attached with variable length lines 228B to the inwardly facing surfaces of the vanes 226. The canopy actuators 251B may also be attached to the variable length lines 228B and can move between an extended position and a retracted position. In the retracted position, the canopy actuators 251B can draw the canopy 227 more tightly around the vanes 226 (e.g., for a streamlined, high speed configuration), and when extended, the canopy actuators 251B can allow the canopy to expand and inflate for a low speed configuration. A representative high speed configuration is identified by dashed lines H, and a representative low speed configuration is identified by dashed lines L.

The motion of the actuators 251 can be controlled by a guidance system 240 and a control system 250 both of which may be powered by a power system 245. In accordance with one embodiment, the control system 250, guidance system 240 and the power system 245 may be housed in the cowling of the drogue 200. The guidance system 240 may receive information corresponding to the current state of the drogue 200 and, in at least some embodiments, a target state of the drogue 200. The guidance system 240 may provide instructions to the control system 250 that in turn directs the actuators 251 to drive the configuration of the drogue 124 from the current state to the target state. In accordance with one embodiment, the guidance system 240 may be coupled to a sensor system 230 that may include one or more accelerometers, one or more gyros, and an image sensor. The accelerometer and or gyros can provide information corresponding to the current motion of the drogue 200, and the image sensor can provide information corresponding to the location of the drogue 200. For example, the image sensor may provide information corresponding to the location of the drogue 200 relative to a receiver aircraft that is approaching the drogue 200 for coupling.

Figure 3:
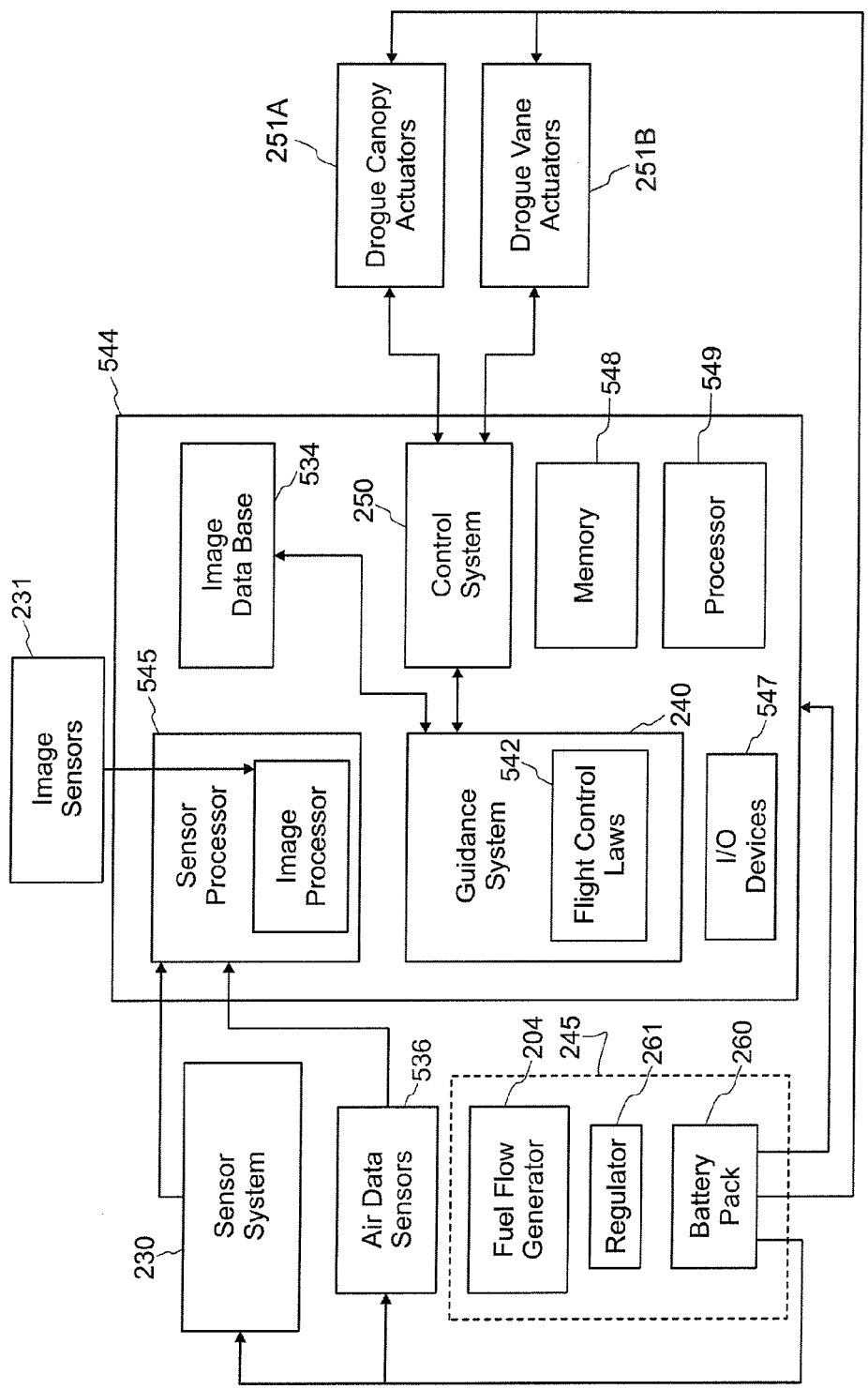
FIG. 3 is a simplified block diagram illustrating components of a system for powering and guiding a refueling drogue.

Referring now to FIG. 3, a block diagram illustrating representative components of the guidance system 240, the control system 250, and the power system 245 is shown. In accordance with one embodiment, the power system 245 may have the generator 204 coupled to a battery pack 260. The generator 204 is used to provide power and or recharge the battery pack 260. In accordance with one embodiment, the output of the generator 204 is first sent to a regulator 261. The regulator 261 may be used to ensure that a constant power level from the generator 204 is sent to the battery pack 260 in order to prevent damage to the battery pack 260 from power surges and the like.

The guidance system 240 and the control system 250 may be computer-based. Accordingly, the drogue 200 may include a computer 544 having a processor 549, memory 548 and I/O devices 547. Functions provided by the computer 544 can be carried out by and or supported by any of these or other components. Such functions include sensor processing carried out by a sensor processor 545. The sensor processor 545 can receive information from the sensor system 230, which can in turn include the accelerometer (e.g., a Z-axis accelerometer), and one or more gyros (e.g., a pitch rate gyro, a roll rate gyro, and a yaw rate gyro). The sensor system 230 can further include an air speed sensor 536 and the image sensor 231 (e.g., a 3-D range image sensor). Accordingly, the guidance system 240 can compare the image data received from the image sensor 231 with data stored on an image database 543. This information can be used to identify the receiver aircraft, and or determine the difference between the current location of the drogue and a target location for the drogue. Flight control laws 542 can be used to transform the difference between the current and target locations of the drogue into directives for the control system 250. Based on these directives, the control system 250 can issue commands to the actuators 251. When the actuators 251 receive the commands, they drive the drogue toward the target position, with feedback provided by the image sensor 231. The actuators 251 can also provide feedback to the control system 250 and the guidance system 240. For example, the actuators 251 can provide feedback information corresponding to the loads on the drogue 200. The information can in turn be used by the guidance system 240 to trim the loads on the drogue 200 to provide for smooth, stable flight of the drogue 200.

Referring now to FIGS. 1-3, in operation, a generator 204A having a rotation device 207 such as an impeller is mounted in the channel 202 of the coupling 225 of the drogue 200. The generator 204A is generally of a size to allow substances from the hose 123 to flow through channel 202 and out of the drogue 200. A plurality of struts 206 may be used to position and secure the generator 204A within the channel 202.

During refueling, the drogue 200 is deployed and extended to the full length of the hose 123. During hose extension the guidance and control systems 240 and 250 are automatically switched on and begin to operate powered by the battery pack 260. The drogue 200 does its job by remaining stable relative to the tanker aircraft 100 through the use of small control movements commanded by the guidance system 240. In the final moments just before contact with the receiver aircraft 104, the drogue 200 steers itself to compensate for any misalignment between its receptacle and the receiver aircraft's probe. Once the drogue 200 is in contact with the receiver aircraft 104, the fuel passes through and rotates the rotation device 207 as the fuel flows into the receiver aircraft's fuel tanks. The generator 204A converts the rotation energy from the rotation device 207 into electrical power. The electrical energy is used to power the guidance system 240 and the control system 250. In accordance with one embodiment, electrical energy is stored in the rechargeable battery pack 260. The fuel flow through the system 110 at 400 to 600 gpm at roughly 55 psi, so the velocity and mass flow are significant enough to generate the necessary watts of electrical power required to recharge the pack and to power the guidance and control systems. During this phase the control systems actuators are switched off to reserve power, the guidance system which consumes only a few watts of power remains switched on and "booted up" in a standby mode. When the receiver aircraft unhooks itself from the drogue the guidance and control systems are switched on again and begin to perform their functions of actively stabilizing and controlling the drogue, ready for the next receiver aircraft. Each time another receiver aircraft couples with the drogue, the battery pack is recharged and ready for the next operational cycle. After the last receiver aircraft is refueled the drogue is retract back into its pod with the drogue batteries fully charged and ready for the next cycle.

While embodiments of the disclosure have been described in terms of various specific embodiments, those skilled in the art will recognize that the embodiments of the disclosure can be practiced with modifications within the spirit and scope of the claims.

What is claimed is:

1. An aerial refueling drogue comprising:
   a coupling having a channel formed there through, wherein one end of the coupling is attached to a hose of said aerial refueling drogue, the channel allowing a liquid substance to flow from the hose through the coupling;
   a power generator unit positioned in the channel; and
   wherein the power generator unit comprises:
   a generator; and
   a rotation device rotatably coupled to the generator;
   wherein the generator and the rotation device are positioned within an interior of the channel and configured to allow the liquid substance to flow through the channel, flow of the liquid substance moving the rotation device allowing the generator to generate electrical power; and
   a plurality of struts positioned around a perimeter of the generator, wherein one end of each strut is attached to the generator and a second end of each strut is attached to the interior of the channel.

2. The aerial refueling drogue of claim 1 wherein at least one strut 206 is hollow.

3. The aerial refueling drogue of claim 1 further comprising an energy storage device coupled to the power generator.

4. The aerial refueling drogue of claim 3 further comprising a regulator attached to the power generator and the energy storage device.

5. The aerial refueling drogue of claim 1 further comprising:
   multiple vanes arranged around an axis of the coupling, and movable in a circumferential direction relative to the axis;
   an actuable device operatively coupled to at least one of the vanes to move the vanes in a circumferential direction relative to the axis; and
   a control system coupled to the actuable device and the power generator for sending signals to the actuable device to move the at least one of the vanes.

6. The aerial refueling drogue of claim 5 further comprising a guidance system 240 coupled to the power generator 204 and the control system 250 to direct operation of the control system 250.

7. The aerial refueling drogue of claim 5 further comprising a canopy coupled to the multiple vanes.

8. An aerial refueling drogue comprising:
a coupling having a channel formed there through, wherein one end of the coupling is attached to a hose of said aerial refueling drogue;
a power generator positioned in the channel, the power generator configured to allow the liquid substance to flow through the channel, flow of the liquid substance allowing the power generator 204 to generate electrical power the power generator generating power when a fluid flows through the channel, wherein the power generator comprises:
a generator positioned in the channel; and
a rotation device rotatably coupled to the generator and positioned in the channel;
at least one a plurality of struts attached to the power generator and an interior of the channel for securing the power generator in the channel, the struts positioned around a perimeter of the power generator;
an energy storage device coupled to the power generator and positioned in a housing; and
a regulator attached to the power generator and the energy storage device.

9. The aerial refueling drogue of claim 8 wherein the at least one strut is hollow to house wiring to attach the power generator to the energy storage device.

10. The aerial refueling drogue of claim 8 further comprising:
multiple vanes arranged around an axis of the coupling, and movable in a circumferential direction relative to the axis;
an actuable device operatively coupled to at least one of the vanes to move the vanes in a circumferential direction relative to the axis; and
a control system coupled to the actuable device and the power generator for sending signals to the actuable device to move the at least one of the vanes.

11. The aerial refueling drogue of claim 10 further comprising a guidance system coupled to the power generator and the control system to direct operation of the control system.

12. The aerial refueling drogue of claim 10 further comprising a canopy coupled to the vanes.

13. A method of generating electrical energy during refueling comprising:
attaching a power generator in a channel of a coupling of a drogue, wherein one end of the coupling is attached to a hose, wherein the power generator comprises:
a generator positioned in the channel; and
a rotation device rotatably coupled to the generator and positioned in the channel;
wherein the generator and the rotation device are positioned within an interior of the channel and configured to allow the liquid substance to flow through the channel, flow of the liquid substance moving the rotation device allowing the generator to generate electrical power;
attaching the drogue with a receiver aircraft; and
passing fuel through the drogue, the fuel rotating an impeller of the power generator.

14. The method of claim 13 further comprising attaching the power generator to a power storage unit, the power generator charging the power storage unit when the fuel rotates the impeller.

15. The method of claim 14 further comprising attaching a regulator to the power generator and the power storage unit.

* * * * *